(No Model.)

J. B. ERDLEY & C. S. SMITH.
FABRIC FOR APRONS OF HARVESTERS.

No. 259,119. Patented June 6, 1882.

Jacob B Erdley
Charles S. Smith
INVENTORS,
by Louis Bagger & Co
ATTORNEYS.

WITNESSES:
Fred. G. Dieterich
John G. Hinkel

UNITED STATES PATENT OFFICE.

JACOB B. ERDLEY AND CHARLES S. SMITH, OF AKRON, OHIO.

FABRIC FOR APRONS OF HARVESTERS.

SPECIFICATION forming part of Letters Patent No. 259,119, dated June 6, 1882.

Application filed April 17, 1882. (No model.)

*To all whom it may concern:*

Be it known that we, JACOB B. ERDLEY and CHARLES S. SMITH, of Akron, in the county of Summit and State of Ohio, have invented certain new and useful Improvements in Fabrics for Aprons of Harvesters; and we do hereby declare that the following is a full, clear, and exact description of the invention, which will enable others skilled in the art to which it appertains to make and use the same, reference being had to the accompanying drawings, which form a part of this specification, and in which—

Figure 1:
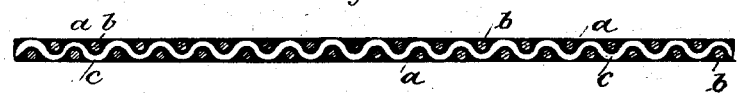
Figure 2:
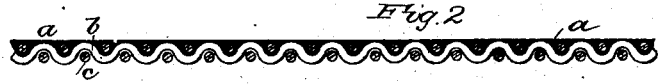
Figure 3:
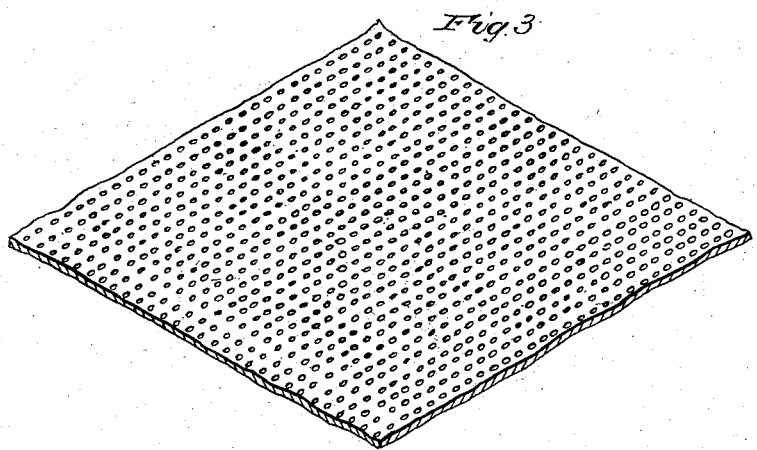

Figure 1 is a cross-section of our improved apron, showing both its sides treated or "filled." Fig. 2 is a cross-section of an apron having one of its sides filled or treated only; and Fig. 3 is a perspective view of the apron, showing the appearance of its filled or treated face.

While our improvement relates more particularly to the aprons of harvesters and reaping-machines for carrying the cut grain to the elevator and dropper or to the binder-cradle, it is applicable also to the grain-apron of thrashing-machines, grain-separators, and other implements of a similar nature employing traveling aprons.

It consists in a peculiar treatment of the duck or canvas of the apron, by which all "stretch" is taken out and the pores of the material filled with a rubber composition, which makes it waterproof, as well as proof against mold and mildew, both when on and off of the machine.

The quality of the duck will depend upon the purposes for which it is to be used, running all the way from eight to thirty-two ounces weight per yard, and differing in width from ten to thirty inches. The "give" or stretch is first taken out by rolling it off one cylinder upon another under pressure and keeping it taut while rolling. It is then run through a suitably-constructed machine, in which one or both of its sides is (or are) coated with a thin film of rubber or rubber composition under pressure, so that the rubber shall fill the pores of the material or the small open spaces between the woof and warp threads, but not form a layer or coating over the entire surface, as in the manufacture of belting or rubber hose, from which our process is entirely different. Thus by reference to the drawings it will be seen that the rubber composition (shown in black at *a*) merely fills in the spaces between the woof-threads *b* and the warp-threads *c* without forming a coat or layer over these. After the material has been prepared in this manner it is passed between a pair of polished steel friction-rollers to give it a perfectly smooth and even surface, after which it is put into a heater and vulcanized or "cured" in the usual manner.

It is desirable to mix a small quantity of powdered borax with the fluid rubber compound before it is applied to the canvas; or powdered borax and powdered oxide of magnesium in equal proportions, which produces a smooth and slippery surface, besides taking out the stretch of the rubber without in the least interfering with its waterproofing qualities.

An apron prepared in this manner will outlast any ordinary duck or canvas apron. It will always fit and run smoothly upon the rollers, will not warp or "crinkle," and is not affected by wet. At the same time its cost over the usual canvases is merely nominal.

Having thus described our invention, we claim and desire to secure by Letters Patent of the United States—

1. As an article of manufacture, an apron for harvesters and thrashing-machines having one or both of its surfaces treated with rubber, so as to fill up the pores of the material between the woof and warp without covering or coating the woof and warp threads, as shown and set forth.

2. As an article of manufacture, an apron for harvesters and thrashing-machines having one or both of its surfaces treated with a compound or composition consisting of ten parts of india-rubber, one part of powdered borax, and one part of powdered oxide of magnesium, said compound filling the pores between the woof and warp threads without coating or covering them, as and for the purpose herein shown and set forth.

In testimony that we claim the foregoing as our own we have hereunto affixed our signatures in presence of two witnesses.

JACOB B. ERDLEY.
CHARLES S. SMITH.

Witnesses:
J. M. FRAZE,
E. F. DONAHUE.